(12) United States Patent
Clar et al.

(10) Patent No.: US 9,481,977 B1
(45) Date of Patent: Nov. 1, 2016

(54) SYSTEM AND METHOD FOR CONTROLLING A MACHINE

(71) Applicant: Caterpillar Inc., Peoria, IL (US)

(72) Inventors: Jean-Jacques Clar, Edelstein, IL (US); Daniel Stanek, Chillicothe, IL (US); Kyle Edwards, Sahuarita, AZ (US); Michael Taylor, Swissvale, PA (US); Robert J. McGee, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/808,569

(22) Filed: Jul. 24, 2015

(51) Int. Cl.
| | | |
|---|---|---|
| E02F 9/20 | (2006.01) | |
| E02F 3/84 | (2006.01) | |
| G05D 1/00 | (2006.01) | |

(52) U.S. Cl.
CPC ............ *E02F 3/841* (2013.01); *E02F 9/205* (2013.01); *E02F 9/2045* (2013.01); *G05D 1/0088* (2013.01)

(58) Field of Classification Search
CPC ............................ E02F 9/2025; E02F 9/2029
USPC ................................ 701/25, 26, 50, 410, 431
See application file for complete search history.

(56) References Cited

U.S. PATENT DOCUMENTS

| | | | | |
|---|---|---|---|---|
| 5,646,844 A * | 7/1997 | Gudat | ................ | E01C 19/004 701/409 |
| 7,010,425 B2 * | 3/2006 | Gray | ................ | A01B 69/008 172/2 |
| 7,313,478 B1 * | 12/2007 | Anderson | ............ | A01B 79/005 702/2 |
| 7,658,234 B2 | 2/2010 | Brandt et al. | | |
| 8,744,626 B2 * | 6/2014 | Johnson | ............... | A01D 34/008 700/250 |
| 8,788,157 B2 * | 7/2014 | Shintani | ............... | E02F 3/7609 172/2 |
| 8,862,390 B2 * | 10/2014 | Sugawara | ................ | E02F 9/26 701/431 |
| 8,868,302 B2 * | 10/2014 | Everett | .................... | G05D 1/00 701/408 |
| 2008/0243345 A1 | 10/2008 | Knight | | |
| 2010/0063651 A1 * | 3/2010 | Anderson | ............ | G05D 1/0088 701/2 |
| 2013/0311031 A1 * | 11/2013 | Friend | ................ | G05D 1/0278 701/26 |
| 2014/0277957 A1 * | 9/2014 | Clar | ........................ | E02F 5/32 701/50 |
| 2014/0336881 A1 * | 11/2014 | Clar | .................... | E02F 9/2045 701/50 |
| 2016/0076222 A1 * | 3/2016 | Taylor | .................. | E02F 9/2025 701/50 |
| 2016/0076223 A1 * | 3/2016 | Wei | ...................... | E02F 9/2029 701/50 |
| 2016/0076224 A1 * | 3/2016 | Edara | .................... | E02F 9/2029 701/50 |
| 2016/0076226 A1 * | 3/2016 | Edara | ................ | G01M 99/005 701/25 |
| 2016/0076893 A1 * | 3/2016 | Wei | ...................... | G05D 1/0274 701/410 |
| 2016/0077513 A1 * | 3/2016 | Wei | ..................... | G05B 19/402 700/114 |
| 2016/0077514 A1 * | 3/2016 | Taylor | ................ | G05B 19/402 700/173 |

* cited by examiner

*Primary Examiner* — Thomas G Black
*Assistant Examiner* — Wae Louie
(74) *Attorney, Agent, or Firm* — Leydig, Voit & Mayer, Ltd.

(57) ABSTRACT

A system for controlling a machine during an autonomous material moving operation includes a terrain sensing system, a position sensing system, and a ground engaging work implement. A controller is configured to determine the topography of the work surface, generate a first target profile, generate signals to autonomously operate the machine along a work surface, receive a plurality of signals associated with a plurality of necessary input conditions, and generate a pause command based upon an absence of one of the plurality of necessary input conditions to define a pause condition. The controller may determine the position of the machine, determine an estimate of an amount of material being moved, generate a second target profile, and generate signals to re-start autonomous operation of the machine based upon the second target profile after elimination of the pause condition.

20 Claims, 5 Drawing Sheets

SYSTEM AND METHOD FOR CONTROLLING A MACHINE

TECHNICAL FIELD

This disclosure relates generally to controlling a machine and, more particularly, to a system and method for controlling a machine during an autonomous material moving operation.

BACKGROUND

Machines such as dozers and motor graders are used to perform a variety of tasks including moving, digging, loosening and carrying different materials at a worksite. For example, these machines may include ground engaging implements used to engage a work surface to move material and/or otherwise alter the work surface at a work site. The machines may operate in an autonomous, semi-autonomous, or manual manner to perform these tasks in response to commands that may be generated as part of a work plan for the machines.

Autonomous or semi-autonomous operation of machines is increasingly desirable for many tasks including those related to mining, earthmoving and other industrial activities. Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

Systems that control the autonomous operation may monitor a plurality of conditions and sub-systems associated with the machines to ensure safe and efficient operation of the machines. An interruption in communication, a failure to follow a desired path, and other undesirable or unexpected conditions may cause an interruption or termination of the autonomous operation in order to maximize the safety of personnel, the machine, and the work site. Improving the efficiency and safety of the autonomous operation of the machines after such interruptions is desirable.

U.S. Patent Publication No. 2014/0336881 discloses a system for re-directing a dozer having a ripper. Upon the machine varying from a desired path, the system may raise the ripper based upon the drawbar pull of the machine and a maximum steering drawbar pull. In some instances, the system may re-direct the machine relative to the desired path and then lower the ripper.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for controlling a machine during an autonomous material moving operation includes a terrain sensing system for generating terrain signals indicative of a topography of a work surface, a position sensing system associated with the machine for generating position signals indicative of a position of the machine, and a ground engaging work implement configured to engage the work surface and move a volume of material. A controller is configured to determine the topography of the work surface based upon the terrain signals, generate a first target profile based upon the topography of the work surface prior to the autonomous material moving operation, generate signals to autonomously operate the machine along the work surface and move material based upon the first target profile, and receive a plurality of signals as the machine moves along the work surface, with the plurality of signals being associated with a plurality of necessary input conditions. The controller is further configured to generate a pause command to pause the autonomous material moving operation based upon an absence of one of the plurality of necessary input conditions, the absence of one of the plurality of necessary input conditions defining a pause condition, determine the position of the machine based upon position signals from the position sensing system, determine an estimate of an amount of material being moved by the ground engaging work implement, generate a second target profile based upon the topography of the work surface after the pause command, the position of the machine after the pause command, and the estimate of the amount of material being moved by the work implement, and generate signals to re-start autonomous operation of the machine along the work surface based upon the second target profile after elimination of the pause condition.

In another aspect, a method of controlling a machine during an autonomous material moving operation along a work surface includes determining a topography of the work surface based upon terrain signals from a terrain sensing system, generating a first target profile based upon the topography of the work surface prior to the autonomous material moving operation, generating signals to autonomously operate the machine along the work surface and move material based upon the first target profile, receiving a plurality of signals as the machine moves along the work surface, with the plurality of signals being associated with a plurality of necessary input conditions. The method further includes generating a pause command to pause the autonomous material moving operation based upon an absence of one of the plurality of necessary input conditions, the absence of one of the plurality of necessary input conditions defining a pause condition, determining the position of the machine based upon position signals from a position sensing system, determining an estimate of an amount of material being moved by a ground engaging work implement as the machine moves along the work surface, generating a second target profile based upon the topography of the work surface after the pause command, the position of the machine after the pause command, and the estimate of the amount of material being moved by the work implement, and generating signals to re-start autonomous operation of the machine along the work surface based upon the second target profile after elimination of the pause condition.

In still another aspect, a system for controlling a machine during an autonomous material moving operation includes a terrain sensing system for generating terrain signals indicative of a topography of a work surface, a position sensing system associated with the machine for generating position signals indicative of a position of the machine, and a ground engaging work implement configured to engage the work surface and move a volume of material. A controller is configured to determine the topography of the work surface based upon the terrain signals, generate a first target profile based upon the topography of the work surface prior to the autonomous material moving operation, and generate signals to autonomously operate the machine along the work surface and move material based upon the first target profile. The controller is further configured to receive a plurality of signals as the machine moves along the work surface with the plurality of signals being associated with a plurality of necessary input conditions, generate a pause command to pause the autonomous material moving operation based upon an absence of one of the plurality of necessary input conditions, the absence of one of the plurality of necessary input conditions defining a pause condition, and generate signals to re-start the autonomous material moving operation after elimination of the pause condition and without operator input.

DETAILED DESCRIPTION

Figure 1:
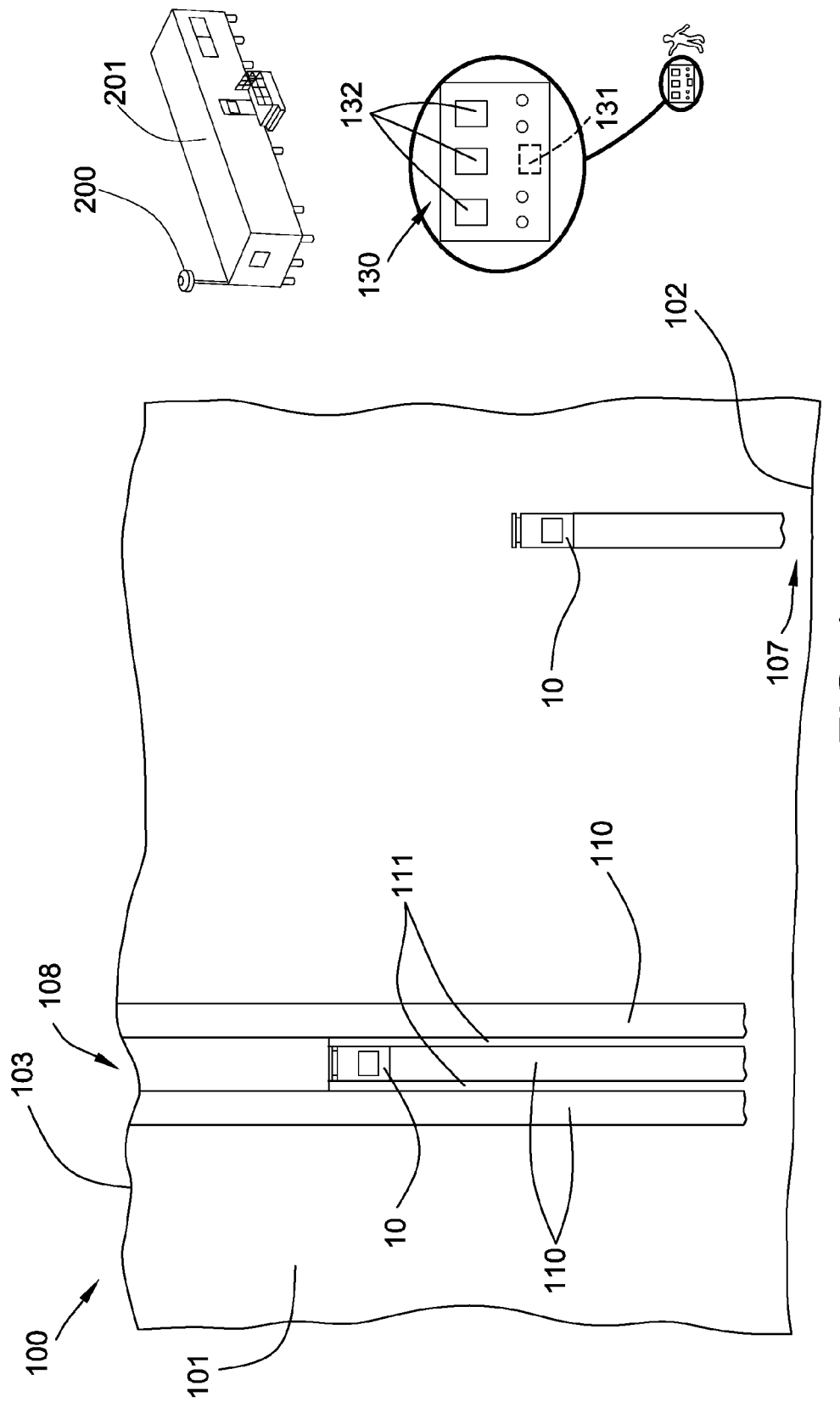
FIG. 1 depicts a schematic view of a work site at which a machine incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, or any other area in which movement of material is desired. Tasks associated with moving material may include a dozing operation, a grading operation, a leveling operation, a bulk material removal operation, or any other type of operation that results in the alteration of the existing topography at work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103. The work surface 104 of the work area 101 may take any form and refers to the actual profile or position of the terrain of the work area.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a load truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. The automatic portion of a semi-autonomous operation may be considered autonomous movement of the machine. A machine being operated manually is one in which an operator is controlling all or essentially all of the functions of the machine. A machine may be operated remotely by an operator (i.e., remote control) in either a manual or semi-autonomous manner.

Figure 2:
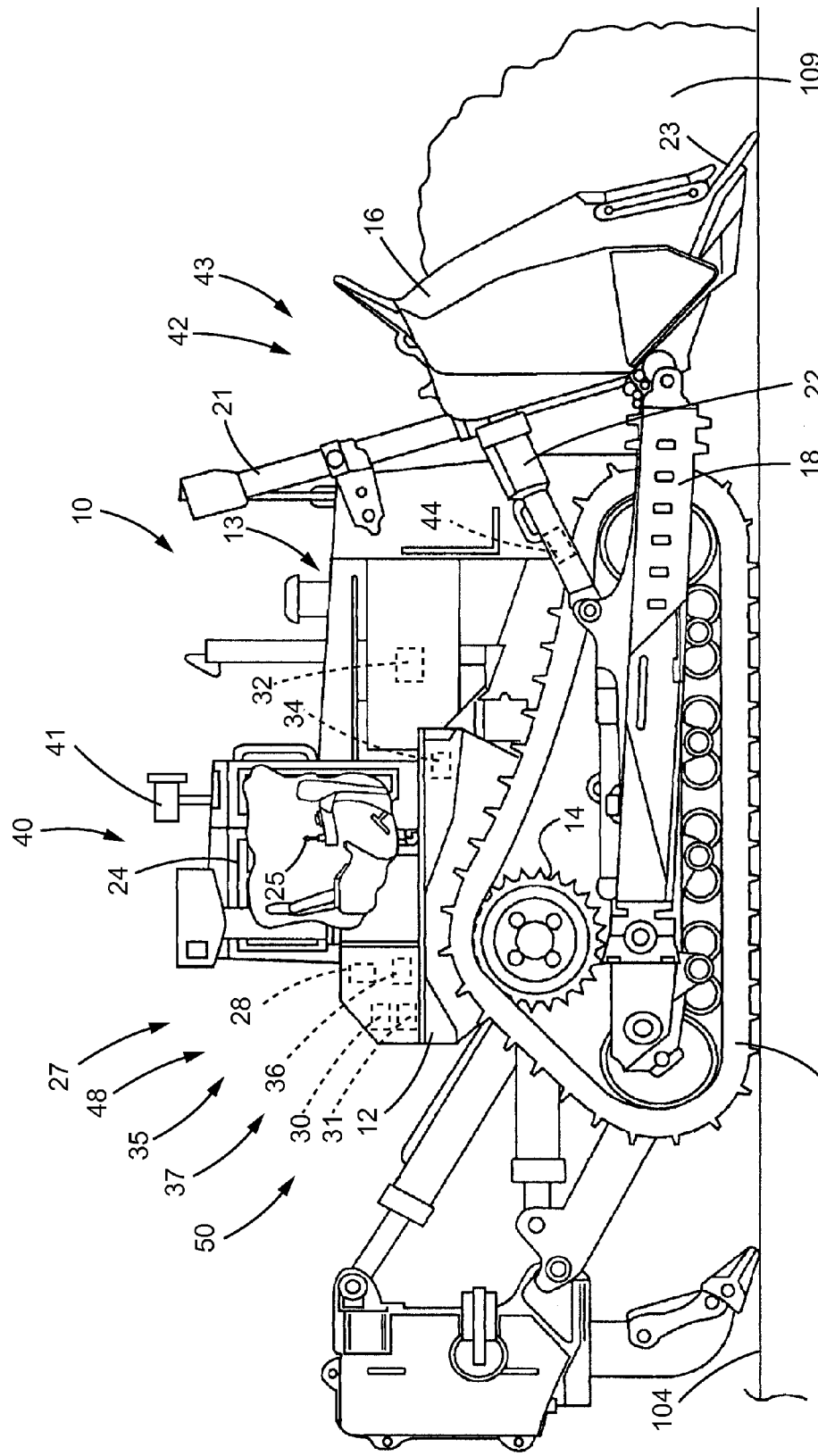
FIG. 2 depicts a diagrammatic illustration of a machine in accordance with the disclosure.

FIG. 2 depicts a diagrammatic illustration of a machine 10 such as a dozer with a ground engaging work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Although machine 10 is shown in a "track-type" configuration, other configurations, such as a wheeled configuration, may be used. Operation of the engine 13 and a transmission (not shown), which are operatively connected to the drive sprockets 14 and tracks 15, may be controlled by a control system 35 including a controller 36. The systems and methods of the disclosure may be used with any machine propulsion and drivetrain mechanisms applicable in the art for causing movement of the machine including hydrostatic, electric, or mechanical drives.

Blade 16 may be pivotally connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip 23 to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within cab 24 or off-board the machine through a wireless communications system 200 (FIG. 1). The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 201 (FIG. 1) or at a remote control unit 130. The functionality of control system 35 may be distributed so that certain functions are performed at machine 10 and other functions are performed remotely. In such case, the control system 35 may include a communications system such as wireless communications system 200 for transmitting signals between the machine 10 and a system located remote from the machine. In one embodiment, remote control unit 130 positioned remote from the machine 10 may provide some or all of the specific commands that are then transmitted by the wireless communications system 200 to systems of the machine.

Machine 10 may be configured to be operated autonomously, semi-autonomously, or manually. When operating semi-autonomously or manually, the machine 10 may be operated by remote control and/or by an operator physically located within the cab 24.

When operating the machine 10 via a remote control system, a portion of the control system 35 may be located at the remote control unit 130. Accordingly, machine 10 may include a machine controller 37 and remote control unit 130 may include a remote unit controller 131. The machine controller 37 and the remote unit controller 131 may be components of controller 36.

In one example, the remote control unit 130 may be configured with an instrument array and controls similar to that of the machine 10 with a plurality of gauges, displays, and input devices such as buttons, knobs, dials, levers, joysticks, and other controls (not shown). The remote control unit 130 may also include a point of view display 132 that includes one or more displays upon which visual images from a visual image system 40 may be displayed to depict a point of view relative to machine 10. The point of view display 132 may be used to display images depicting the front, the rear, the left side, and the right side of machine 10. If desired, additional images of other points of view may be displayed such as views of other aspects of the machine (e.g., the blade 16).

When operating machine 10 by remote control, the machine 10 and the remote control unit 130 may communicate via the wireless communications system 200. Each of the machine 10 and the remote control unit 130 may include wireless communication devices to permit wireless transmission of a plurality of data signals between the machine and the remote control unit as well as permit communication with other systems remote from the machine and the remote control unit.

Machine 10 may be equipped with a plurality of machine sensors 26, as shown generally by an arrow in FIG. 2 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position and orientation of the machine 10 are sometimes collectively referred to as the pose of the machine. The position sensor 28 may include a plurality of individual sensors that cooperate to generate and provide position signals to controller 36 indicative of the position and orientation of the machine 10.

In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 36 may use position signals from the position sensor 28 to determine the position of the machine 10 within work site 100. In other examples, the position sensor 28 may include an odometer or another wheel rotation sensing sensor, a perception based system, or may use other systems such as lasers, sonar, or radar to determine all or some aspects of the position of machine 10.

In some embodiments, the position sensing system 27 may include a separate orientation sensing system. In other words, a position sensing system may be provided for determining the position of the machine 10 and a separate orientation sensing system may be provided for determining the orientation of the machine. If desired, the position sensing system 27 may also be used to determine a ground speed of machine 10. Other sensors or a dedicated ground speed sensor may alternatively be used to determine the ground speed of the machine 10.

Additional sensors may be provided such as pitch rate sensor 30 (e.g., a gyroscope), acceleration sensor 31 (e.g., a 3-axis accelerometer), engine speed sensor 32, and track speed sensor 34. The control system 35 may include an implement load monitoring system 42 shown generally by an arrow in FIG. 2. The implement load monitoring system 42 may include a variety of different types of implement load sensors depicted generally by an arrow in FIG. 2 as an implement load sensor system 43 to measure the load on the blade 16. The load on the blade 16 may be used to determine an estimate of an amount of material being moved by the blade. In one embodiment, the implement load sensor system 43 may embody one or more pressure sensors 44 for use with one or more hydraulic cylinder, such as second hydraulic cylinders 22, associated with blade 16. Signals from the pressure sensor 44 indicative of the pressure within the second hydraulic cylinders 22 may be monitored by controller 36. The load on the blade 16 may be correlated to the load on the engine 13 by controller 36.

The machine 10 may include a visual image system 40 such as a camera system for generating visual images indicative of a point of view relative to the machine 10. The visual image system 40 may include a plurality of visual image sensors such as cameras 41 for generating visual image signals. The visual image signals may be transmitted wirelessly to a system remote from machine 10 such as remote control unit 130. The plurality of cameras 41 of the visual image system 40 may be positioned to capture different views that an operator would have from within the cab 24 of machine 10. If desired, a plurality of cameras 41 may also be positioned to provide a point of view including the machine 10 and/or the blade 16 as well as a portion of the work site 100 at which the machine is operating. The visual image system 40 may be desirable in a plurality of instances including when operating the machine 10 remotely via a remote control unit 130 (FIG. 1), when the visibility of an operator within the cab 24 is limited, or when personnel remote from the machine desire to observe the operation of the machine such as when the machine is operating autonomously.

Machine 10 may be configured to move material at the work site 100 according to one or more material movement plans from an initial location 107 such as near high wall 102 to a spread or dump location 108. The dump location 108 may be at crest 103 or at any other location. The material movement plans may include, among other things, forming a plurality of spaced apart channels or slots 110 that are cut into the work surface 104 at work site 100 along a path 117 (FIG. 3) from the initial location 107 to the dump location 108. In doing so, each machine 10 may move back and forth along a linear path between the initial location and the dump location. If desired, a relatively small amount of material may be left or built up as walls 111 between adjacent slots 110 to prevent or reduce spillage and increase the efficiency of the material moving process. The process of moving material through slots 110 while utilizing walls 111 of material to increase the efficiency of the process is sometime referred to as "slot dozing."

Figure 3:
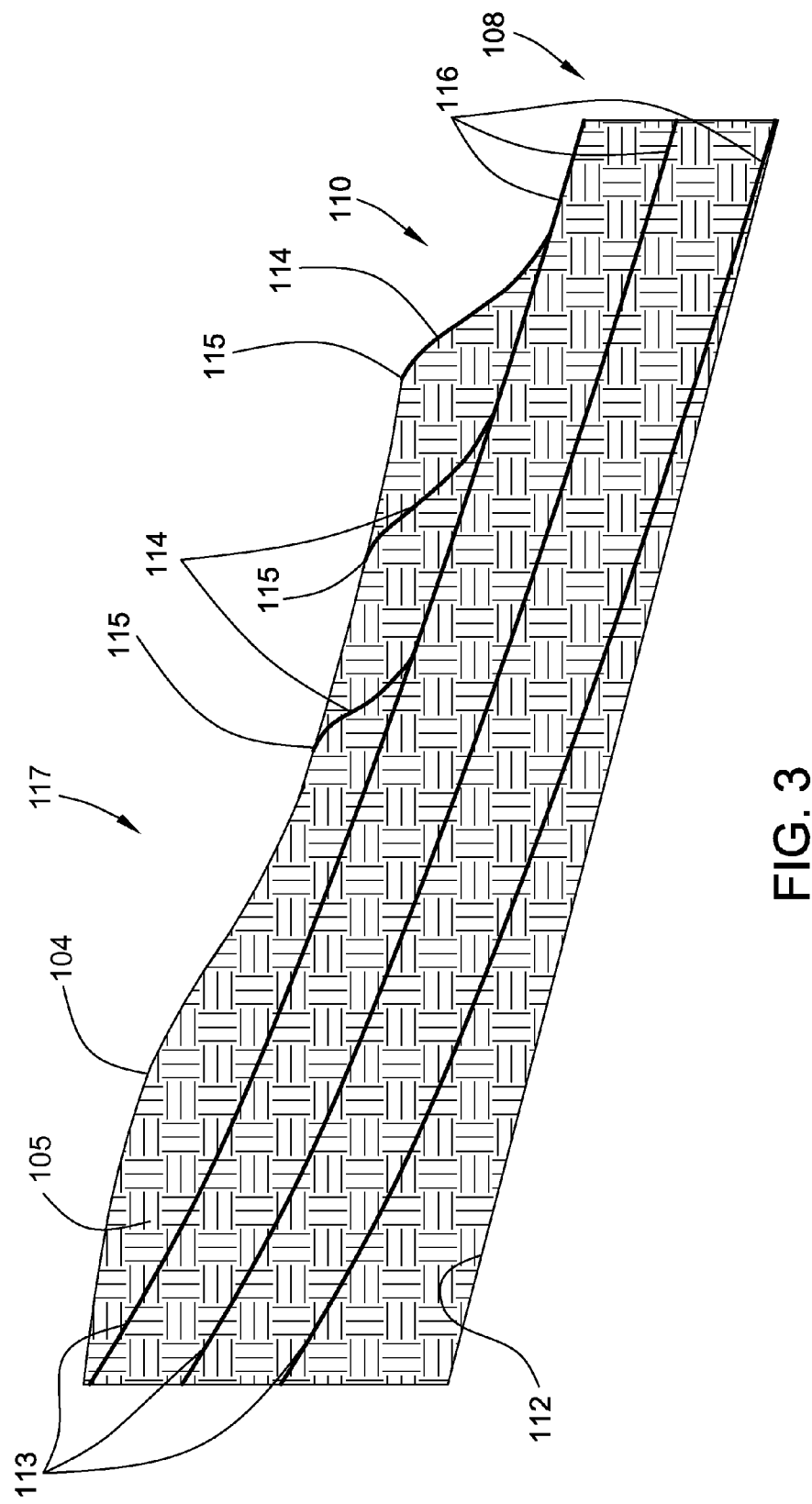
FIG. 3 depicts a cross-section of a portion of a work site depicting various aspects of a material moving plan.

As depicted in FIG. 3, in one embodiment, each slot 110 may be formed by initially setting the desired parameters of the final work surface or final design plane 112. Material may be removed from the work surface 104 in one or more layers or passes 113 until the final design plane 112 is reached. The blade 16 of machine 10 may engage the work surface 104 with a series of cuts 114 that are spaced apart lengthwise along the slot 110. Each cut 114 begins at a cut location 115 along the work surface 104 at which the blade 16 initially engages the work surface and extends into the material 105 towards the pass target or carry surface 116 for a particular pass. Controller 36 may be configured to guide the blade 16 along each cut 114 until reaching the carry surface 116 and then follow the carry surface towards the dump location 108. To do so, planning system may set a plurality of targets or way points and controller 36 may guide the blade to reach each way point as the machine 10 moves along path 117.

Figure 4:
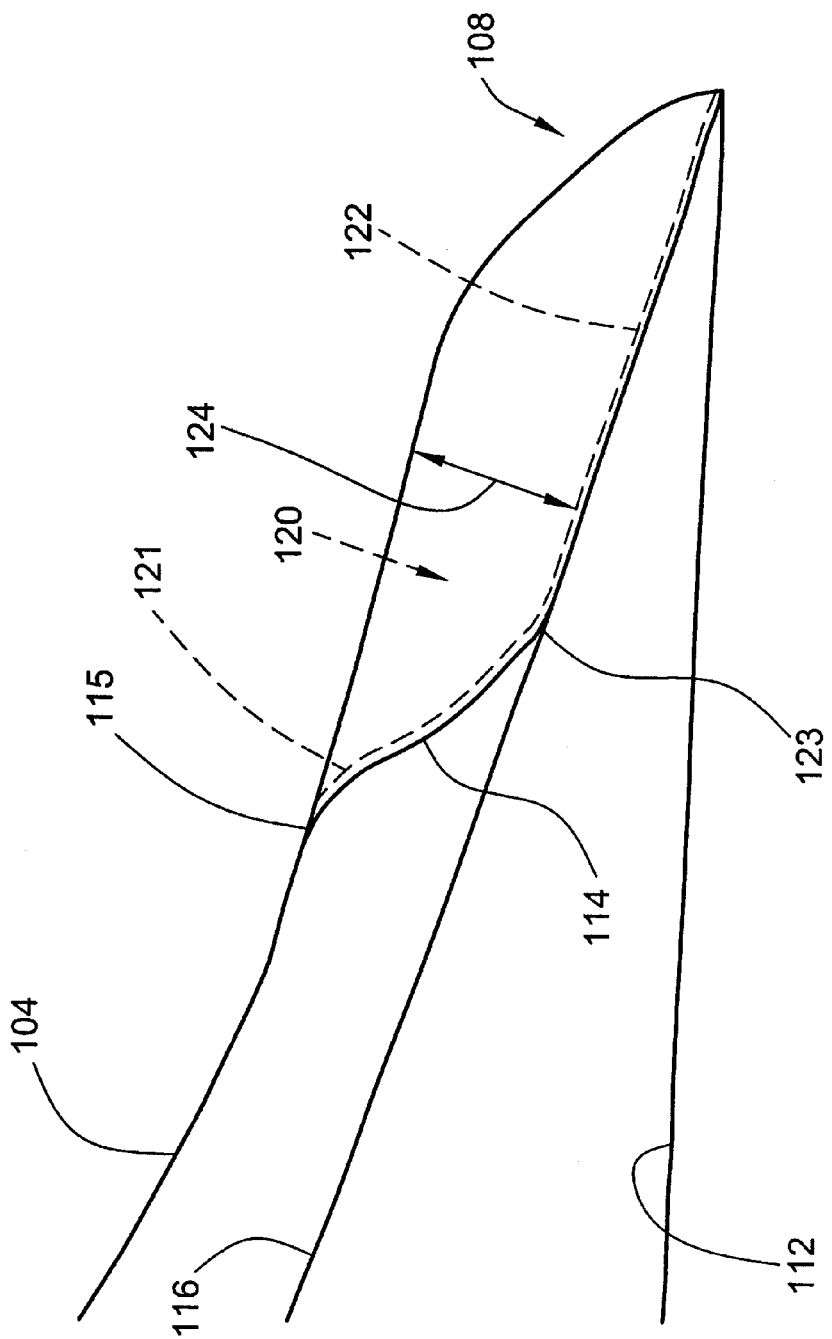
FIG. 4 depicts a diagrammatic cross-section of a portion of a work site depicting a potential target profile.

More specifically, during each material moving pass, the controller 36 may be configured to guide the blade 16 generally along a desired path or target profile depicted by dashed line 120 in FIG. 4 from the cut location 115 to the dump location 108. A first portion 121 of the target profile 120 extends from the cut location 115 to the carry surface 116. The first portion 121 may be referred to as the loading profile as that is the portion of the target profile 120 at which the blade 16 is loaded with material. A second portion 122 of the target profile 120 extends from the intersection 123 of the cut 114 and the carry surface 116 to the dump location 108. The second portion 122 may be referred to as the carry profile as that is the portion of the target profile 120 at which the blade 16 carries the load along the carry surface 116.

Control system 35 may also include a module or planning system 48 for determining or planning various aspects of the excavation plan. The planning system 48 may receive various types of input such as the configuration of the work surface 104, the final design plane 112, the cut location 115, a desired loading profile, a desired carry profile, and characteristics of the material to be moved. Operating characteristics and capabilities of the machine 10 such as maximum load may also be entered into the planning system 48. The planning system 48 may simulate the results of cutting at a particular cut location and for a particular target profile, and then choose a cut location and target profile that creates the most desirable results based on one or more criteria.

FIG. 4 is an illustration of a potential cut 114 at work site 100 that may be generated by planning system 48. Work surface 104 represents the uppermost height of the existing material at the slot 110. While the illustration is depicted in two dimensions, it should be appreciated that the data representing the illustration may be in three dimensions. For example, the data representing work surface 104 may include a plurality of data points that represent the uppermost height of existing material at a plurality of locations along work surface 104. This information may be obtained according to any method known in the art. In one example, the machine 10 may utilize the position sensing system 27 described above to map out the contour of work surface 104 as machine 10 moves across it. This data may also be obtained according to other methods such as by a vehicle that includes lasers and/or cameras. It should be noted that as the machine 10 moves material to the dump location 108, the position of the work surface 104 may be updated based upon the current position of the machine 10 and the position of the blade 16.

The loading profile begins at cut location 115 on work surface 104 and ends at carry surface 116. As depicted in FIG. 4, the loading profile may be generally arcuate with a generally symmetrical curve. The carry surface 116 may be generally arcuate and curved downward to utilize gravity in an advantageous manner.

As may be seen in FIG. 4, moving the blade 16 along the target profile 120 will result in a volume of material 105 being moved from slot 110. The planning system 48 may use the shape of the loading profile and the cut location 115 to determine the volume of material that would be moved by blade 16 if the machine 10 were to follow the target profile 120. More specifically, the planning system 48 may use three-dimensional data that is used to represent the machine 10, the work surface 104, and the target profile 120 to make a volumetric calculation of the volume of material that will be moved for a particular target profile 120.

The control system 35 may include an autonomous operation system 50 that functions to control the machine 10 while the machine is operating autonomously, either in fully autonomous mode or semi-autonomous mode. In doing so, autonomous operation system 50 may monitor a plurality of systems associated with machine 10 and only operate the machine autonomously when all of the systems are operating in a desired manner. More specifically, the autonomous operation system 50 may monitor a plurality of necessary input conditions, from systems that are on-board or off-board machine 10, whose performance must meet desired thresholds for the machine 10 to be operated autonomously. If all of the necessary input conditions are not met (i.e., the machine 10 and its related systems are not operating within their desired thresholds), the autonomous operation system 50 may stop or pause the machine 10. Accordingly, the absence of one of the plurality of necessary input conditions is referred to herein as the presence of a pause condition. In other words, the specific necessary input condition that is absent may be defined as a pause condition since such absence may cause the autonomous operation of the machine 10 to pause.

Necessary input conditions may be aspects of each of the relevant systems and subsystems that must operate in a desired manner and/or properly communicate. In one example, the autonomous operation system 50 may require appropriate operation of each of and accurate communication between the machine 10, the command center 201, the remote control unit 130, and any other desired system (e.g., a GPS system). In other words, each of the relevant systems must transmit and received the necessary or desired communications signals. In another example, a necessary input condition may be that the accuracy and confidence in the position and orientation (i.e., the pose) of the machine 10 must be sufficiently high.

Still another necessary input condition may be that the appropriate visual images must be available from the visual image system 40 at the remote control unit 130. For example, the autonomous operation system 50 may require that the front camera or left and right cameras be operating properly while the machine 10 is moving forward and the rear camera be operating properly while the machine is moving in reverse.

Each of these necessary input conditions may be generally characterized as communications errors and autonomous operation of machine 10 may be stopped or paused if a failure or interruption (e.g., lack of appropriate signals or poor signal quality) occurs for a time period that exceeds a predetermined time threshold. In one example, the length of time of an interruption or lack communication may be different depending upon the type of communication and/or the location of the machine 10 at the work site 100. For example, an interruption in the signals between the command center 201 and the remote control unit 130 while the machine 10 is operating a significant distance from the crest 103 may be less critical, and thus the time threshold longer, as compared to an interruption in the signals between the visual image system 40 and the remote control unit 130 while the machine is operating near the crest.

Other necessary input conditions may relate to the mission plan received from the planning system 48 and the proposed target profile that the machine 10 is expected to follow. For example, the mission plan must be received from the planning system 48 and be in a proper or desired form. In addition, the path 117 along which the machine 10 is expected to travel must meet certain criteria. One condition may be that the data that defines the three-dimensional work surface 104 along the path 117 must be continuous so that there are no gaps or undefined sections. Another condition may be that the data that defines the three-dimensional work surface 104 must be less than an age threshold in order to increase the likelihood of its accuracy. In one example, the data must be no more than 30 minutes old.

Still another condition may be that the path 117 along which the machine 10 is expected to travel may not exceed a predetermined slope since travel along a work surface 104 that exceeds the predetermined slope may be dangerous for the machine or exceed the machine's capabilities. Further conditions may include the position of the crest 103 near the path 117 must be known and the data defining the crest be less than an age threshold.

Still further necessary input conditions may relate to the position or operating conditions of the machine 10. For example, the autonomous operation system 50 may require the machine 10 to be within a predetermined position or alignment threshold of the desired path 117 in order to continue autonomous operation. In one example, the center of the machine 10 must be within two meters of the center of the desired path 117. In another example, the planned trajectory of the machine must be no more than twenty degrees from the center of the desired path.

Another necessary input condition may be that the machine 10 must not be stuck or experiencing excessive slipping. To make this determination, the controller 36 may compare the speed of the tracks 15 to each other and to the actual ground speed of the machine 10. Still another necessary input condition may be that the machine 10 and/or its projected path must not be within a predetermined distance of another machine or the projected path of the other machine while both machines are present.

Still another necessary input condition may be the receipt of the proper authorization in order to proceed or continue with a material moving operation. For example, in some instances, approval from a remote control operator or the command center 201 may be required before a machine 10 may enter a crest zone (i.e., an area near the crest 103) or some type of restricted area (not shown). In another example, authorization from a remote control operator or the command center 201 may be required before a machine 10 may begin a material moving operation.

A further necessary input condition may be a measure of operator presence at the remote control unit 130. In one example, the autonomous operation system 50 may require some type of activity by the operator (e.g., an operator input) at the remote control unit 130 within a predetermined time period. For example, an operator may be required to take some action (e.g., operate an input device, change a display screen) within fifteen minutes in order to continue autonomous operation. In another example, operator presence may be measured by determining when an operator is seated at the remote control unit 130.

In each instance, the lack of a necessary input condition (i.e., the existence of a pause condition) may cause the generation of a pause command that results in stopping or pausing the autonomous operation of the machine 10. In some instances, a pause command may be reversed and autonomous operation re-started upon the resolution or receipt of the necessary input condition that was lacking. In other instances, operator action or intervention may be required before autonomous operation of the machine 10 may be re-started.

Figure 5:
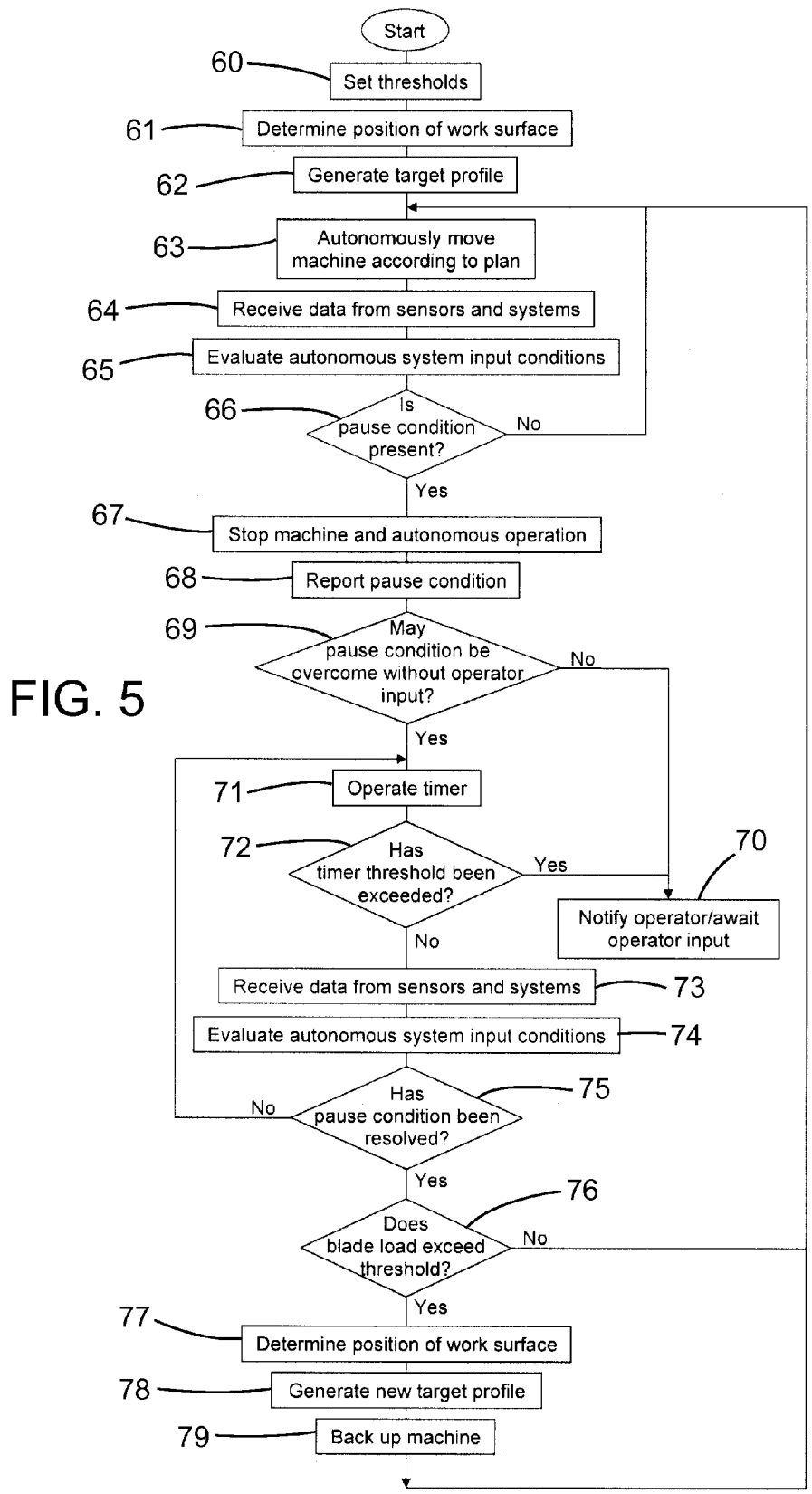
FIG. 5 depicts a flowchart illustrating an autonomous material moving process in accordance with the disclosure.

Operation of the autonomous operation system 50 is depicted in the flowchart in FIG. 5. At stage 60, a plurality of thresholds may be set or stored within controller 36 with each corresponding to one of the necessary input conditions. A necessary input condition may have a different threshold depending upon the location of the machine (e.g., within or outside the crest zone) and the operation being performed (e.g., cut, carry, or operating in reverse).

A timer threshold may also be set or stored within controller 36 at stage 60. As discussed below, the timer threshold may define a time period in which the autonomous operation system 50 may permit the machine 10 to re-start autonomous operation after the machine is stopped by a pause condition during an autonomous operation. In one example, the timer threshold may be set at five minutes. Further, a blade load threshold may be set or stored within controller 36. As discussed below, the blade load threshold may define a volume or amount of material that determines when the machine 10 may be required to back up before beginning autonomous operation after the machine is automatically stopped due to the presence of a pause condition. In some examples, the blade load threshold may vary depending upon the slope at which the machine 10 is operating and the material characteristics of work surface 104.

At stage 61, the position or configuration of the work surface 104 may be determined and stored as an electronic map within controller 36. The position of the work surface 104 may be determined in any desired manner including moving machine 10 autonomously about the work site 100 and determining the topography of the work surface based upon position sensing system 27 and the known dimensions of the machine. In an alternate process, an operator may manually operate machines, either from within the cab 24 of the machine or by remote control, and the topography of the work site 100 recorded based upon the position of the machines and their known dimensions. In another alternate embodiment, a mapping vehicle (not shown) may be moved about the work site 100. In still another embodiment, instruments such as lasers may be used to map the work surface 104 of the work site 100. The system or systems that operate to determine the topography or position of work surface 104 operate as a terrain sensing system that generates terrain signals indicative of the topography of the work surface. The terrain signals may be used by controller 36 to determine the topography and generate a three-dimensional map of the work surface 104. It should be noted that while moving a machine 10 along the work surface 104, the position of the machine may be used to determine the position of the work surface and update the electronic map of the work site 100 within the controller 36.

The controller 36 may generate at stage 62 a target profile 120 as part of a material movement plan. The target profile may include a cut location 115, a loading profile, and a carry profile. Using the topography of the path 117 and the characteristics of the machine 10, the planning system 48 may analyze a plurality of cut locations 115 together with potential loading and carry profiles to determine the desired target profile 120.

At stage 63, the controller 36 may generate the appropriate signals to autonomously operate the machine 10 to perform a material moving operation and move the blade 16 along the desired target profile 120. As the machine 10 is operated autonomously, the controller 36 may receive at stage 64 data from various sensors and systems associated with the machine.

At stage 65, the controller 36 may analyze or evaluate each of the necessary input conditions required for operation of the autonomous operation system 50. For example, controller 36 may determine whether all of the necessary communications have been received, whether the machine 10 is or will be off its desired path, whether the expected path is unsafe or uncertain, and the proximity of the machine to other machines.

At decision stage 66, the controller 36 may determine whether a pause condition is present (i.e., whether each of the necessary input conditions exists). If a pause condition does not exist (i.e., all of the necessary input conditions exist), the machine 10 may operate autonomously and stages 63-66 are repeated. If a pause condition exists, the machine 10 together with its autonomous operation are stopped at stage 67 and the machine may be commanded to idle in place.

If desired, upon the presence of a pause condition, the details of the pause condition (i.e., the necessary input condition that is not present or has not been met) together with the location of the occurrence at the work site 100 may be reported or otherwise noted at stage 68 such as to a system remote from the machine. Upon the repeated occurrence of a pause condition at the same or a similar location, management or other personnel may request remediation or other action to prevent or reduce the likelihood of future pause conditions at that location.

At decision stage 69, the controller 36 may determine whether the pause condition may be overcome without input from the remote operator. For example, a communications error may be caused by some type of interference that is temporary and may resolve itself without intervention or action by the remote operator. In another example, a pause condition may occur when the machine 10 and another machine are too close together. In such case, stopping the machine 10 until the other machine passes may resolve the pause condition without input from the remote operator.

Under some circumstances, it may be possible to eliminate a pause condition related to the electronic map without the intervention of the remote control operator. For example, if the position of the crest 103 is undefined or the data too old, or if the data from electronic map along the path is missing or is too old, the data may be replaced with new data if another machine or system operates to define the required components of the electronic map. This may occur if another machine is operating in the area and provide the necessary data to the controller 36. In other instances, it may be desirable for the remote control operator to operate the machine 10 by remote control to re-define or update the data defining the crest or the path 117.

Other pause conditions may not be overcome or resolved without input from the remote control operator. For example, if the machine 10 is stuck or experiencing excessive slipping so that it may become stuck, it will typically be undesirable to permit the machine to continue to operate autonomously without input from the remote control operator. In another example, input from the remote control operator is likely desirable if the intended path of the machine 10 will cause the machine to travel along an excessive slope. In some instances, if the machine 10 is or will be off-track by an amount that exceeds the alignment threshold, the position of the machine may be considered a pause condition that requires input from the remote control operator to overcome.

If the pause condition may not be overcome without input from the remote control operator, the controller 36 may notify the remote operator at stage 70 and the machine 10 may idle or otherwise remain inoperative until the remote operator takes the necessary actions. If the pause condition may be overcome without input from the remote operator, the controller 36 may begin at stage 71 a timer that operates to measure the amount of time that the machine 10 has remained idle or stopped due to the pause condition.

At decision stage 72, the controller 36 may determine whether the time since the start of the pause condition has exceeded the timer threshold. If the time has exceeded the timer threshold, the controller 36 may notify the remote operator at stage 70 and the machine 10 may idle or otherwise remain inoperative until the remote operator takes the necessary actions to begin operation again. If the time has not exceeded the timer threshold, the machine 10 may idle or otherwise remain inoperative while the controller 36 receives at stage 73 data from various sensors and systems associated with the machine 10 as described above with respect to stage 64. At stage 74, the controller 36 may analyze or evaluate each of the necessary input conditions required for operation of the autonomous operation system 50 as described above with respect to stage 65.

At decision stage 75, the controller 36 may determine whether the source of the pause condition has been resolved or eliminated. If the pause condition has not been resolved, stages 71-75 may be repeated until either the timer threshold has been exceeded at stage 72 or the pause condition has been resolved at stage 75. If the pause condition has been resolved at stage 75, the controller 36 may determine at decision stage 76 whether an estimate of the volume or amount of material in front of the blade 16 is so large that it is undesirable for the machine 10 to begin moving forward as it re-starts autonomous operation. To do so, controller 36 may determine whether the blade load exceeds the blade load threshold. In one embodiment, the estimate of the amount of material being moved by the blade 16 may be determined through the use of implement load sensor system 43. In another embodiment, an estimate of the amount of material being moved by the blade 16 may be determined based upon the topography of the work surface 104 prior to the material moving operating and the path followed by the blade as the machine 10 moves along the work surface 104.

If the load on the blade 16 is less than the blade load threshold, the controller 36 may generate signals to re-start the autonomous movement of the machine 10 and operation of the machine may be restarted at stage 63 of the flowchart. In one example, this may occur when the machine 10 has not yet begun or has only partially begun its cut into the work surface 104. In other words, if the load on the blade 16 is small enough, the machine 10 may be able to follow the target profile generated at stage 62 without causing undue wear on the machine including the transmission and undercarriage.

If the load on the blade 16 exceeds the blade load threshold, the controller 36 may determine at stage 77 the new or current topography of the work surface 104. It should be noted that the topography or position of the work surface 104 behind the machine 10 may be modified as compared to the topography of the work surface determined at stage 61 since the machine 10 has moved along the path 117. In addition, the topography or position of the work surface 104 immediately in front of blade 16 may also be modified as compared to the topography determined at stage 61 since the blade may have a volume or amount of material 109 (FIG. 2) positioned in front of the blade. Based upon the new topography of the work surface 104, the controller 36 may determine at stage 78 a new or second target profile including a new or second cut location, a new or second loading profile, and a new or second carry profile. In some instances, any or all of the second cut location, the second loading profile, and the second carry profile may be unchanged from those generated at stage 62.

In some instances, the controller 36 may at stage 79 back up or operate the machine 10 in reverse for a desired distance. Further, the controller 36 may also re-orient the machine, if desired, such during a reversing operation, to better position it along the second target profile. Backing up the machine 10 for some distance (e.g., one or two meters) so that the machine may begin moving forward in an unloaded or relatively unloaded manner may permit the blade 16 to more efficiently follow the new or second target profile and reduce stress and wear on the transmission and undercarriage of the machine. The controller 36 may then generate signals to re-start the autonomous forward movement of the machine 10 and operation of the machine may be re-started at stage 63 of the flowchart but following the new or second target profile.

In situations in which one or more additional pause conditions arise while autonomous operation is paused due to a first pause condition such as during stages 71-75, the controller 36 may evaluate the additional pause conditions in a manner similar to stage 69 to determine if any of the additional pause conditions may be overcome without operator input. If any of the additional pause conditions may not be overcome without operator input, the system may proceed to stage 70. If the additional pause conditions may be overcome without operator input, the timer may continue to operate even if the original pause condition and/or any of the other additional pause conditions are overcome or resolved without operator input.

If multiple pause conditions occur simultaneously or overlap, the controller 36 may be configured to operate in any of a plurality of manners. In a first example utilizing only pause conditions that may be overcome without operator input, if plurality of pause conditions occur simultaneously, the timer may begin to operate and is stopped only upon the resolution or elimination of the last to be resolved pause condition. In a second example utilizing only pause conditions that may be overcome without operator input, if a first pause condition occurs, the timer may begin to operate. If a second pause condition occurs but before the first pause condition is resolved, the timer may not be stopped until the second pause condition has been resolved even if first pause condition is resolved. In other words, once a first pause condition has occurred, the timer may not stop even if the first pause condition is resolved if one or more additional pause conditions begin before the resolution of the first pause condition. Resolution of all of the pause conditions before the timer threshold has been reached will result in re-starting autonomous operation of machine 10 such as at decision stage 76. In a further example, regardless of the timing, if a pause condition occurs that may not be overcome without operator input, the operator may be notified and the system may await the operator input before re-starting autonomous operation such as at stage 70.

INDUSTRIAL APPLICABILITY

The industrial applicability of the system described herein will be readily appreciated from the forgoing discussion. The foregoing discussion is applicable to autonomously or semi-autonomously operated machines 10 having a work implement that engages the work surface 104 along a path 117 Such system may be used at a mining site, a landfill, a quarry, a construction site, a roadwork site, or any other area in which movement or mixing of materials is desired.

When moving material along a work surface 104 in an automated manner, it is desirable to maintain a high efficiency of operation. In some instances, necessary input conditions will not be met and autonomous movement of the machine 10 will be stopped or paused. In some instances, operator intervention may be required before continuing or re-starting the autonomous operation. In other instances, the autonomous operation may be automatically re-started if the pause condition giving rise to the interruption in autonomous operation is resolved (i.e., all of the necessary input conditions have been met). In one embodiment, the autonomous operation may not be re-started if the time elapsed after the pause condition occurs exceeds a timer threshold.

Prior to re-starting the autonomous material moving operation, the planning system 48 may generate a new target profile 120 including a new cut location 115, loading profile, and/or carry profile. If desired, the controller 36 may back up the machine 10 as part of re-starting the autonomous material moving operation to minimize wear on the machine.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for controlling a machine during an autonomous material moving operation, comprising:
   a terrain sensing system for generating terrain signals indicative of a topography of a work surface;
   a position sensing system associated with the machine for generating position signals indicative of a position of the machine;
   a ground engaging work implement configured to engage the work surface and move a volume of material; and
   a controller configured to:
      determine the topography of the work surface based upon the terrain signals;
      generate a first target profile based upon the topography of the work surface prior to the autonomous material moving operation;
      generate signals to autonomously operate the machine along the work surface and move material based upon the first target profile;
      receive a plurality of signals as the machine moves along the work surface, the plurality of signals being associated with a plurality of necessary input conditions;
      generate a pause command to pause the autonomous material moving operation based upon an absence of one of the plurality of necessary input conditions, the absence of one of the plurality of necessary input conditions defining a pause condition;
      determine the position of the machine based upon position signals from the position sensing system;
      determine an estimate of an amount of material being moved by the ground engaging work implement;
      generate a second target profile based upon the topography of the work surface after the pause command, the position of the machine after the pause command, and the estimate of the amount of material being moved by the ground engaging work implement; and
      generate signals to re-start autonomous movement of the machine along the work surface based upon the second target profile after elimination of the pause condition.

2. The system of claim 1, wherein the controller is further configured to re-start the autonomous movement automatically upon the elimination of the pause condition.

3. The system of claim 1, wherein the controller is further configured to determine whether a time threshold has passed without resolving a source of the pause command and requires an operator input upon exceeding the time threshold.

4. The system of claim 1, wherein the controller is configured to determine the estimate of the amount of material being moved based upon a path followed by the ground engaging work implement as the machine moves along the work surface.

5. The system of claim 1, wherein the controller is configured to determine the estimate of the amount of material being moved based upon a load on the ground engaging work implement as the machine moves along the work surface.

6. The system of claim 1, wherein the pause command is generated based upon a communications error.

7. The system of claim 6, wherein the communications error is a failure to receive desired communications signals within a desired threshold.

8. The system of claim 1, wherein the pause command is generated based upon a lack of operator input from a remote control unit.

9. The system of claim 1, wherein the controller is further configured to store a plurality of thresholds associated with the plurality of necessary input conditions and generate a pause command if any of the plurality of necessary input conditions exceeds a respective one of the plurality of thresholds.

10. The system of claim 1, wherein the controller is further configured to generate a second pause command in which operator input is required prior to re-starting autonomous operation after generating the second pause command.

11. The system of claim 10, wherein the second pause command is generated based upon an absence of one of a second plurality of input conditions.

12. The system of claim 1, wherein the controller is further configured to communicate the pause command including a location of the machine at a work site to a system remote from the machine.

13. The system of claim 1, wherein the pause command is generated based upon a proximity of the machine to another machine.

14. The system of claim 1, wherein the pause command is generated based upon a slope of the work surface exceeding a desired threshold.

15. A method of controlling a machine during an autonomous material moving operation along a work surface, comprising:
   determining a topography of the work surface based upon terrain signals from a terrain sensing system;
   generating a first target profile based upon the topography of the work surface prior to the autonomous material moving operation;
   generating signals to autonomously operate the machine along the work surface and move material based upon the first target profile;
   receiving a plurality of signals as the machine moves along the work surface, the plurality of signals being associated with a plurality of necessary input conditions;
   generating a pause command to pause the autonomous material moving operation based upon an absence of one of the plurality of necessary input conditions, the absence of one of the plurality of necessary input conditions defining a pause condition;

determining a position of the machine based upon position signals from a position sensing system;

determining an estimate of an amount of material being moved by a ground engaging work implement as the machine moves along the work surface;

generating a second target profile based upon the topography of the work surface after the pause command, the position of the machine after the pause command, and the estimate of the amount of material being moved by the ground engaging work implement; and generating signals to re-start autonomous operation of the machine along the work surface based upon the second target profile after elimination of the pause condition.

16. The method of claim 15, further including re-starting the autonomous movement automatically upon the elimination of the pause condition.

17. The method of claim 15, further including determining whether a time threshold has passed without resolving a source of the pause command and requiring an operator input upon exceeding the time threshold.

18. The method of claim 15, further including storing a plurality of thresholds associated with the plurality of necessary input conditions and generating a pause command if any of the plurality of necessary input conditions exceeds a respective one of the plurality of thresholds.

19. The method of claim 15, further including generating a second pause command in which operator input is required prior to continuing autonomous operation after generating the second pause command.

20. A system for controlling a machine during an autonomous material moving operation, comprising:

a terrain sensing system for generating terrain signals indicative of a topography of a work surface;

a position sensing system associated with the machine for generating position signals indicative of a position of the machine;

a ground engaging work implement configured to engage the work surface and move a volume of material; and a controller configured to:
  determine the topography of the work surface based upon the terrain signals;
  generate a first target profile based upon the topography of the work surface prior to the autonomous material moving operation;
  generate signals to autonomously operate the machine along the work surface and move material based upon the first target profile;
  receive a plurality of signals as the machine moves along the work surface, the plurality of signals being associated with a plurality of necessary input conditions;
  generate a pause command to pause the autonomous material moving operation based upon an absence of one of the plurality of necessary input conditions, the absence of one of the plurality of necessary input conditions defining a pause condition; and
  generate signals to re-start the autonomous material moving operation after elimination of the pause condition and without operator input.

* * * * *